US009251482B2

(12) United States Patent
Kwak (10) Patent No.: US 9,251,482 B2
(45) Date of Patent: Feb. 2, 2016

(54) CHRONICALLY-PROBLEMATIC RESPONSE ALERT SYSTEM FOR SERVICE REQUEST AND FULFILLMENT BETWEEN A SERVICE REQUESTER AND A SERVICE PERFORMER

(71) Applicant: TrueLite Trace, Inc., Cupertino, CA (US)

(72) Inventor: Sung Bok Kwak, Cupertino, CA (US)

(73) Assignee: Truelite Trace, Inc., Sunnyvale, CA (US)

( * ) Notice: Subject to any disclaimer, the term of this patent is extended or adjusted under 35 U.S.C. 154(b) by 224 days.

(21) Appl. No.: 13/935,366

(22) Filed: Jul. 3, 2013

(65) Prior Publication Data

US 2015/0012641 A1   Jan. 8, 2015

(51) Int. Cl.
*G06F 15/16* (2006.01)
*G06Q 10/00* (2012.01)
*G06Q 10/06* (2012.01)

(52) U.S. Cl.
CPC .......... *G06Q 10/06* (2013.01); *G06Q 10/06398* (2013.01)

(58) Field of Classification Search
CPC .......... G06Q 10/06; G06Q 10/0639–10/06398
See application file for complete search history.

(56) References Cited

U.S. PATENT DOCUMENTS

| | | | | |
|---|---|---|---|---|
| 4,701,849 A * | 10/1987 | Elden | ............... | G06Q 10/06398 705/7.42 |
| 5,999,088 A | 12/1999 | Sibbitt | | |
| 6,151,565 A * | 11/2000 | Lobley et al. | .......... | G06Q 10/06 703/2 |
| 6,366,196 B1 * | 4/2002 | Green et al. | ............. | 340/286.09 |
| 7,385,479 B1 | 6/2008 | Green et al. | | |
| 8,135,635 B2 * | 3/2012 | Molotsi et al. | ................... | 705/32 |
| 2002/0194047 A1 * | 12/2002 | Edinger et al. | ......... | G06Q 10/06 705/7.14 |
| 2003/0135406 A1 * | 7/2003 | Rowe | ............... | 705/11 |
| 2004/0227617 A1 | 11/2004 | Vasquez et al. | | |
| 2005/0046547 A1 * | 3/2005 | Gagnon | .................. | 340/286.09 |
| 2005/0046548 A1 * | 3/2005 | Foster et al. | ............. | 340/286.09 |
| 2005/0216331 A1 * | 9/2005 | Ahrens et al. | ................... | 705/11 |
| 2007/0191000 A1 | 8/2007 | Veni, III et al. | | |
| 2007/0198329 A1 * | 8/2007 | Lyerly et al. | .................... | 705/11 |
| 2007/0299709 A1 * | 12/2007 | Harrell et al. | ..................... | 705/8 |
| 2008/0284573 A1 | 11/2008 | Stambaugh et al. | | |
| 2009/0153348 A1 * | 6/2009 | Zai et al. | .................... | 340/686.6 |
| 2010/0007472 A1 * | 1/2010 | Kunz | ........................... | 340/10.6 |
| 2010/0100464 A1 * | 4/2010 | Ellis et al. | ........................ | 705/33 |
| 2011/0078138 A1 * | 3/2011 | Cardella | ....................... | 707/723 |

(Continued)

*Primary Examiner* — Emmanuel L Moise
*Assistant Examiner* — Julian Chang
(74) *Attorney, Agent, or Firm* — Invent Capture, LLC.; Samuel S. Cho (57) ABSTRACT

An electronic alert system and a related method of operation for identifying, determining, and reporting chronically-problematic responses for service request and fulfillment between a service requester and a service performer are disclosed. In one embodiment, the electronic alert system identifies and determines a chronically-problematic response by analyzing two relational data sets. A first set of relational data set correlates time elapsed between a first service request bell press by a service requester from a service request device, and a confirmatory signal of successful service fulfillment from a service request reception device held by the service performer, or from the service request device. Furthermore, a second set of relational data set correlates a number of repeated service request bell presses by the service requester, a time interval between each bell press, and the confirmatory signal of successful service fulfillment from the service request device or the service request reception device.

18 Claims, 8 Drawing Sheets

A System Application Diagram for a Chronically-Problematic Response Alert System

(56) References Cited

U.S. PATENT DOCUMENTS

| | | |
|---|---|---|
| 2011/0252097 A1* | 10/2011 | Walker et al. .............. 709/206 |
| 2012/0215579 A1* | 8/2012 | O'Connor et al. .......... 705/7.14 |
| 2013/0030861 A1* | 1/2013 | Umamaheswaran et al. .......................... 705/7.28 |
| 2013/0076489 A1 | 3/2013 | Veni, III |
| 2013/0339105 A1* | 12/2013 | Russell et al. .............. 705/7.42 |
| 2014/0114706 A1* | 4/2014 | Blakely ........................... 705/5 |
| 2014/0200937 A1* | 7/2014 | Friedman ......... G06Q 10/06398 705/7.13 |
| 2014/0229258 A1* | 8/2014 | Seriani ...................... 705/14.23 |
| 2014/0267226 A1* | 9/2014 | Yoon ............................ 345/419 |
| 2015/0006263 A1* | 1/2015 | Heier ......................... 705/7.42 |
| 2015/0045122 A1* | 2/2015 | Acres et al. ..................... 463/42 |

\* cited by examiner

An Embodiment of a Service Request Reception Device

FIG. 1

Embodiments of Service Request Reception Devices

FIG. 2

A System Application Diagram for a Chronically-Problematic Response Alert System

FIG. 3

Another System Application Diagram for a Chronically-
Problematic Response Alert System

A System Block Diagram of a Cloud-Computing Server Operating a Chronically-Problematic Response Alert System

Conventional Service Request System Paradigm

New Paradigm: Response Time Improvement by Reduction or Elimination of Chronically-Problematic Service Performers.

FIG. 8

CHRONICALLY-PROBLEMATIC RESPONSE ALERT SYSTEM FOR SERVICE REQUEST AND FULFILLMENT BETWEEN A SERVICE REQUESTER AND A SERVICE PERFORMER

BACKGROUND OF THE INVENTION

The present invention generally relates to service request devices and service request reception devices. The present invention also relates to utilizing a service request device to prompt a response from a service performer wearing, holding, or watching a service request reception device. Furthermore, the present invention also relates to improving operational efficiency of an organization by intelligently understanding and managing interactions between a service requester that uses a service request device and a service performer that uses a service request reception device.

Service-oriented and in-person business operations often deploy service request devices to enable a customer to gain attention from a service performer. For example, a classical and conventional form of a service request device is a physical bell placed on a table in a restaurant, on a hotel check-in counter, or on a front counter of a store. When a customer rings the physical bell, the sound of the physical bell alerts a service performer, such as a restaurant worker, a hotel staff member, or a store clerk to be physically present in front of the customer to fulfill a service request. In recent years, electronic service request devices (e.g. electronic service request bells, one-way or two-way pagers, and etc.) are widely deployed in business operations to prompt a service performer via a service request reception device that a service is being requested at a particular location. In many cases, an electronic service request device has a unique device identification number or code that is correlated to a table number, a counter number, or another location-identifying information easily understood by a service performer. These electronic devices can also be utilized in industrial and manufacturing operations. For example, a factory worker can press a bell button from a service request device to prompt attention from a supervisor or a support staff, if there is a problem or an issue in an assembly-line operation.

Unfortunately, these electronic forms of service requests and paging do not necessarily yield faster or efficient response time from a service performer. For example, an unmotivated service performer may intentionally ignore a bell press from a service request device. More damagingly, the unmotivated service performer may persistently ignore or neglect service requests from a multiple number of service request devices used by customers or employees, thereby causing a serious bottleneck or weakness in operational efficiency of a business organization that utilizes electronic service request bells and/or pagers. Furthermore, the unmotivated service performer may exhibit persistently-delayed or sporadic responses to various service requests from customers or other individuals, thereby causing significant operational delays and inefficiencies. Supervising entities or operational quality control staff members presently do not have effective methods or apparatuses to identify and determine a poorly-behaving service performer that ignores service requests or delays service fulfillments.

Therefore, it may be beneficial to devise a novel electronic alert system that identifies and determines a poorly-behaving service performer that exhibits chronically-problematic responses to service requests by customers or other individuals. Furthermore, it may also be beneficial to devise the novel electronic alert system to report the identified, poorly-behaving service performer to a supervising entity or to an operational quality control staff. Moreover, it may also be beneficial to devise the novel electronic alert system to utilize cloud-computing resources available on the Internet for seamless portability, upgrades, and operation with installed base of electronic service request and reception devices. In addition, it may also be beneficial to devise a method for operating this novel electronic alert system.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an electronic alert system for identifying, determining, and reporting chronically-problematic responses for service request and fulfillments between a service requester and a service performer is disclosed. This electronic alert system comprises: a CPU and a memory unit configured to execute and process a plurality of computerized instructions and data; a first set of relational data that tracks time elapsed between a first service request bell press from a service request device and a confirmatory signal of successful service fulfillment from a service request reception device; a second set of relational data that tracks a number of repeated service request bell presses, a time interval between each of the repeated service request bell presses from the service request device, and the confirmatory signal of successful service fulfillment from the service request reception device; an analytical and alert threshold determination module executed on the CPU and the memory unit, wherein the analytical and alert threshold determination module identifies and determines the chronically-problematic responses by analyzing the first set of relational data and the second set of relational data that characterize the service performer's behavior associated with the service performer's service request reception device; a data storage that stores the first set of relational data and the second set of relational data, wherein the data storage is operatively connected to the CPU and the memory unit to upload any portion of the first set of relational data and the second set of relational data based on data uploading instructions from the analytical and alert threshold determination module; and a data and alert communication module executed on the CPU and the memory unit, wherein the data and alert communication module generates and transmits an alert to a supervising entity, if the analytical and alert threshold determination module identifies and determines the chronically-problematic responses associated with the service performer's service request reception device to exceed an alert threshold level.

In another embodiment of the invention, a method of operating a chronically-problematic response alert system is also disclosed. This method comprises the steps of: receiving or identifying a particular service request device ID that initiates a first service request bell press from a service request device to a service request reception device of a service performer, wherein the particular service request device ID is received or identified via an analytical and alert threshold module and a data and alert communication module executed on a CPU and a memory unit of the chronically-problematic response alert system; measuring time elapsed from the first service request bell press to a confirmatory signal of successful service fulfillment from the service request reception device by utilizing the analytical and alert threshold module executed on the CPU and the memory unit of the chronically-problematic response alert system; measuring a number of repeated service request bell presses and a time interval between each of the repeated service request bell presses associated with the particular service request device ID since the first service request bell press from the service request device, wherein the step of measuring the number of repeated service request bell presses and measuring the time interval between each of the repeated service request bell presses is performed by the analytical and alert threshold module executed on the CPU and the memory unit of the chronically-problematic response alert system; if the service performer is determined to be chronically problematic by the analytical and alert threshold module, alerting and informing a supervising entity with identifying information of the service performer and a brief description of persistent problems associated with the supervising entity; and else if the service performer is determined not to be chronically problematic, checking whether the confirmatory signal of successful service fulfillment is received by the data and alert communication module executed on the CPU and the memory unit of the chronically-problematic response alert system.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic alert systems for chronically-problematic responses for service request and fulfillment between a service requester and a service performer. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "chronically-problematic response" is defined as a persistent pattern of ignored responses and/or delayed responses to a service request received by a service performer's service request reception device. In one example, the persistent pattern may comprise a combination of ignored responses and/or delayed responses that substantially exceed an average number of ignored responses and/or delayed responses by other service performers of a business operation for a particular period of time (e.g. per daily cycle, per weekly cycle, per monthly cycle, and etc.). In one example, if an electronic alert system determines that a particular service performer has exhibited the persistent pattern of ignored responses or delayed responses, that particular service performer can be flagged by the electronic alert system, and a "chronically-problematic response" alert can be transmitted to a supervising entity or an operational quality control staff member.

Furthermore, for the purpose of describing the invention, a term "service" is defined as a task, a work order, a product order, or another favor that a service performer can conduct or complete for a service requester.

In addition, for the purpose of describing the invention, a term "response" is defined as an act of physical summon to a service requester's location, or an electronic reply to a service request transmitted from a service request device operated by the service requester.

Moreover, for the purpose of describing the invention, a term "fulfillment" is defined as satisfactorily completing a service (e.g. a task, a work order, a product order, or another favor) requested by a service requester. In one embodiment of the invention, the term "fulfillment" may be construed as identical as the term "response," meaning that it is an act of physical summon to a service requester's location, or an electronic reply to a service request transmitted from a service request device operated by the service requester In another embodiment of the invention, the term "fulfillment" may be construed distinctly from the term "response," due to the degree of completeness of a particular service. In this alternate embodiment of the invention, the term "fulfillment" may imply that a service requested by a service requester is satisfactorily completed, as opposed to a mere initial response to the service requester.

Furthermore, for the purpose of describing the invention, a term "service performer" is defined as a person who is assigned by a business operation to provide a specific service to a service requester, who is typically a customer or a client of the business operation. In some cases, a service performer and a service requester may be colleagues in the same business operation, wherein the service performer provides troubleshooting support or other business-related support to the service requester. In some other cases, a service performer and a service requester may have a contractor-client relationship.

In addition, for the purpose of describing the invention, a term "service requester" is defined as a customer, a client, or a colleague who utilizes an electronic form of a "service request device" to make a service request to a service performer. In one example, a service requester is a customer in a restaurant who presses a bell button on a service request device to summon a waitress (i.e. a service performer), and subsequently order an additional drink from the restaurant's menu. In another example, a service requester is a hotel guest who presses a bell button on a service request device to summon a hotel staff member (i.e. a "service performer), and subsequently make a service request to clean his or her guest room. Yet in another example, a service requester is a factory worker who presses a bell button on a service request device to summon a repair technician (i.e. a "service performer) to repair or replace a broken toolset.

Moreover, for the purpose of describing the invention, a term "service request device" is defined as an electronic device that is configured to make an electronic service request to another electronic device used by a service performer. Examples of a service request device include, but are not limited to, an electronic service request bell, an electronic one-way or two-way pager, or another service request-capable electronic device.

Furthermore, for the purpose of describing the invention, a term "service request reception device" is defined as an electronic device that is configured to receive an electronic service request from a service request device. In one example, a service request reception device may be a watch-style electronic device worn by a service performer, wherein a display panel in the watch-style electronic device shows identifying information and/or location information of a service request device or a service requester. In another example, a service request reception device may be a larger standalone display panel configured to show identifying information and/or location information of a service request device or a service requester. Yet in another example, a service request reception device may be a mobile phone or another portable electronic device that executes a paging application to receive incoming service requests associated with a service requester.

One aspect of an embodiment of the present invention is providing a novel electronic alert system that identifies and determines a poorly-behaving service performer that exhibits chronically-problematic responses to service requests by customers or other individuals.

Another aspect of an embodiment of the present invention is providing a novel electronic alert system to report the identified, poorly-behaving service performer to a supervising entity or to an operational quality control staff.

Yet another aspect of an embodiment of the present invention is providing a novel electronic alert system to utilize cloud-computing resources available on the Internet for seamless portability, upgrades, and operation with installed base of electronic service request and reception devices.

Yet another aspect of an embodiment of the present invention is providing a method for operating a novel electronic alert system that identifies, determines, and reports a poorly-behaving service performer that exhibits chronically-problematic responses to service requests by customers or other individuals.

Figure 1:
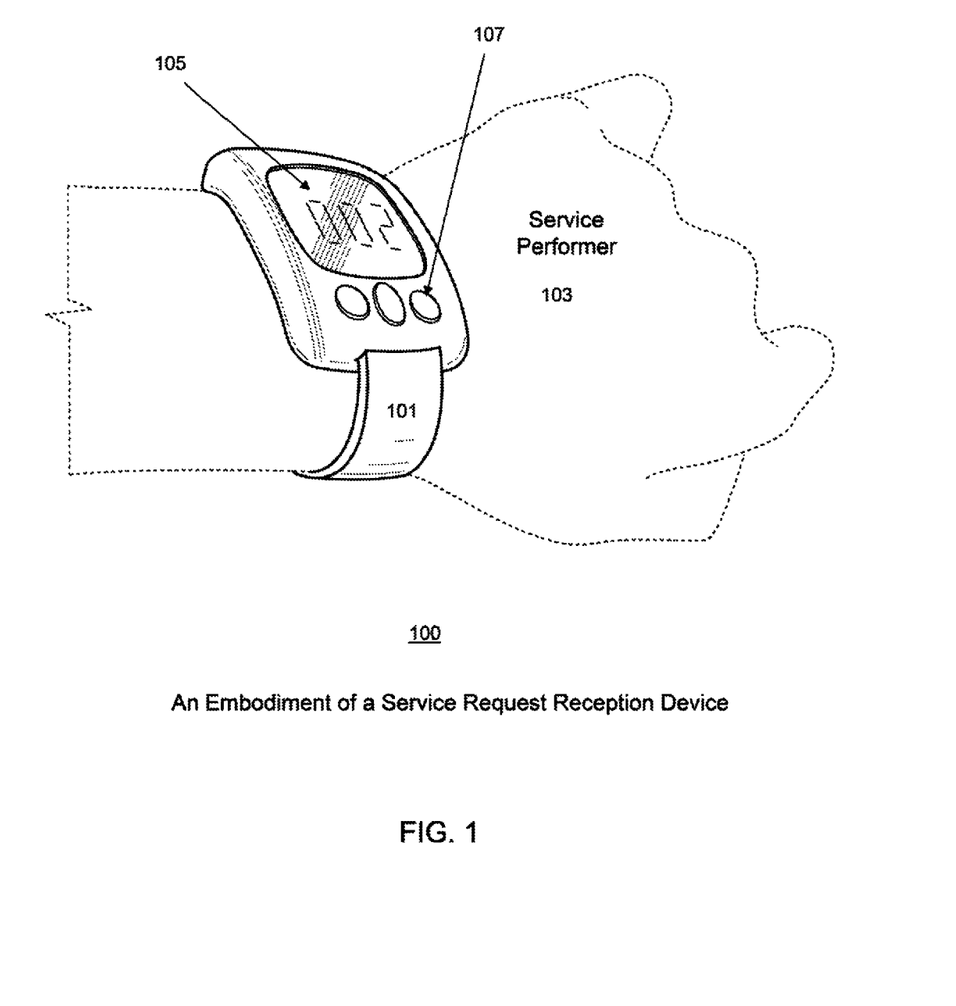
FIG. 1 shows a perspective view of a service request reception device worn by a service performer, in accordance with an embodiment of the invention.

FIG. 1 shows a perspective view (100) of a service request reception device (101) worn by a service performer (103), in accordance with an embodiment of the invention. The service request reception device (101) as shown in FIG. 1 is a "watch-style" wearable electronic device that can receive a service request signal wirelessly. Typically, the service request signal is generated by a service request device utilized by a service requester. An example of the service request device is an electronic service request bell with a bell button. Furthermore, the service request signal typically carries identification information of a particular location (e.g. a table ID in a restaurant, a particular section in an assembly line in a factory, a particular aisle at a store, and etc.) or a device ID associated with the service request device. When the service request reception device (101) receives the service request signal wirelessly, the service request reception device (101) is able to display location-identifying information or device-identifying information (e.g. "002" as a table number in a restaurant, or a service request device ID number in a manufacturing assembly line) on a display panel (105) of the service request reception device (101), as shown in FIG. 1.

Furthermore, in some cases, the service request reception device (101) can have one or more functional buttons (107), which can turn power on or off for the service request reception device (101), switch from one display mode to another, or customize device settings. In addition, in some embodiments of the service request reception device (101), a functional button (e.g. 107) can be depressed to transmit a service request acknowledgement signal back to the service request device before the service performer (103) can physically approach the service requester, or to transmit a confirmatory signal of successful service fulfillment if certain conditions are satisfied. Examples of certain conditions for the successful service fulfillment include, but are not limited to, a proximity sensor-based physical presence confirmation of a service performer coming near a service requester, a button press on a service request device by the service requester when a service requested is successfully completed, or another electronic confirmation method for indicating the successful fulfillment. In some cases, a mere physical summoning of a service performer near a service requester, or an electronic response from the service performer via a service request reception device to the service request device is considered a "successful" service fulfillment. In other cases, an actual completion of a service requested by a service requester, beyond the initial physical summoning of the service performer, is considered a "successful" service fulfillment.

Figure 2:
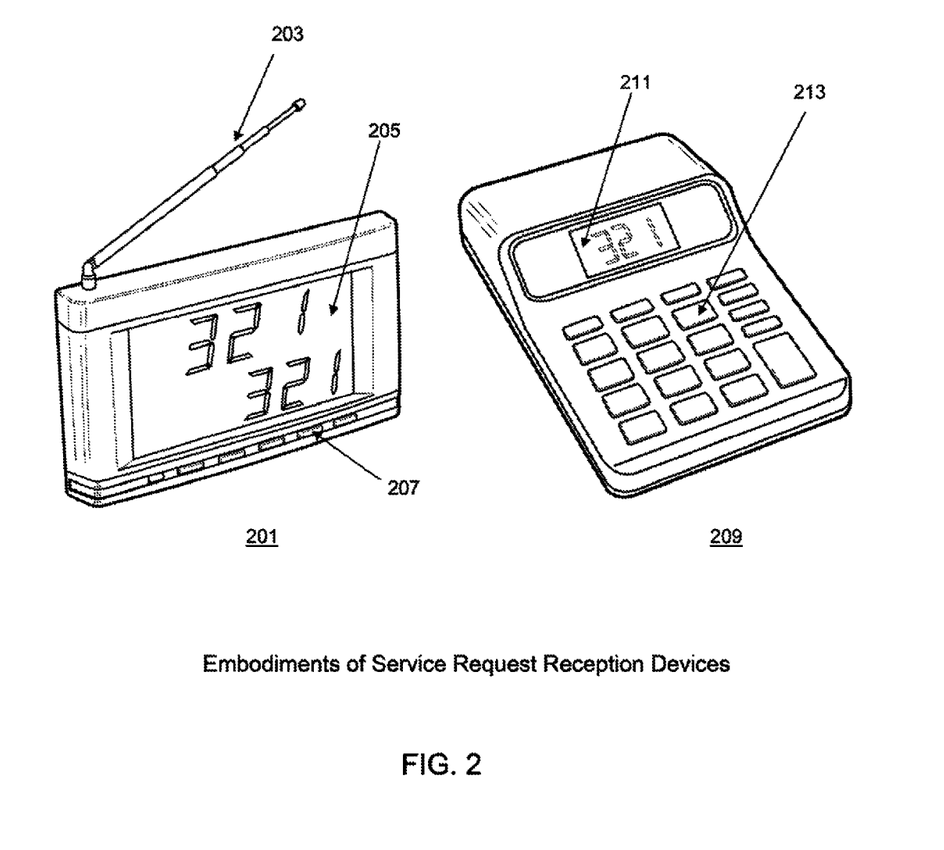
FIG. 2 shows a perspective view of other service request reception devices that a service performer can utilize to receive service requests electronically from a service requester, in accordance with an embodiment of the invention.

FIG. 2 shows a perspective view (200) of other service request reception devices (201, 209) that a service performer can utilize to receive service requests electronically from a service requester, in accordance with an embodiment of the invention. In one embodiment of a service request reception device, a "scoreboard-style" service request reception device (201) shown on the left side of FIG. 2 can be placed on a visible spot in a business operation, so that a multiple number of service performers or managers can periodically check which location or which service request device is paging for a service. For example, the scoreboard-style service request reception device (201) can be placed near a restaurant kitchen area or an employee rest area, which enables an available waiter or waitress to respond to a customer service request paged (e.g. a service request bell button press from a service request device) from a particular table number. The scoreboard-style service request reception device (201) comprises a radio-frequency (RF) antenna (203), a display unit (205) that can display location or device ID information (e.g. "321" as shown in FIG. 2) associated with a service requester, one or more functional buttons (207), and relevant internal electronics parts that can acquire, demodulate, process wireless signals.

In another embodiment of a service request reception device, a "calculator-style" service request reception device (209), as shown on the right side of FIG. 2, can be utilized in a business operation, so that a cashier, a business owner, or a manger can periodically check which location or which service request device is paging for a service. Furthermore, in some situations, the calculator-style service request reception device (209) may be able to enter a specific location ID or a service request device ID (e.g. "321") manually with physical key buttons (213), so that other service request reception devices can share the manually-entered information for efficient response to service requests. The calculator-style service request reception device (209) comprises an embedded radio-frequency (RF) antenna, a display unit (211) that can display location or device ID information associated with a service requester, one or more physical key buttons (213), and relevant internal electronics parts that can acquire, demodulate, process wireless signals.

Like most other service request reception devices, each of the scoreboard-style service request reception device (201) and the calculator-style service request reception device (209) can receive a service request signal wirelessly. Typically, the service request signal is generated by a service request device utilized by a service requester. The service request signal also typically carries identification information of a particular location (e.g. a table ID in a restaurant, a particular section in an assembly line in a factory, a particular aisle at a store, and etc.) or a device ID associated with the service request device. When the scoreboard-style service request reception device (201) or the calculator-style service request reception device (209) receives the service request signal wirelessly, it is able to display location-identifying information or device-identifying information (e.g. "321" as a table number in a restaurant, or a service request device ID number in a manufacturing assembly line) on a display panel (205 or 211) of the scoreboard-style service request reception device (201) or the calculator-style service request reception device (209), as shown in FIG. 2.

Furthermore, in some cases, functional buttons (207) or physical keys (213) on each service request reception device (201 or 209) can turn device power on or off, switch from one display mode to another, or customize device settings. In addition, in some embodiments of the service request reception device (201 or 209), a functional button (e.g. 207 or 213) can be depressed to transmit a service request acknowledgement signal back to the service request device before the service performer can physically approach the service requester, or to transmit a confirmatory signal of successful service fulfillment if certain conditions are satisfied.

Examples of certain conditions for the successful service fulfillment include, but are not limited to, a proximity sensor-based physical presence confirmation of a service performer coming near a service requester, a button press on a service request device by the service requester when a service requested is successfully completed, or another electronic confirmation method for indicating the successful fulfillment. In some cases, a mere physical summoning of a service performer near a service requester, or an electronic response from the service performer via a service request reception device to the service request device is considered a "success-ful" service fulfillment. In other cases, an actual completion of a service requested by a service requester, beyond the initial physical summoning of the service performer, is considered a "successful" service fulfillment.

Figure 3:
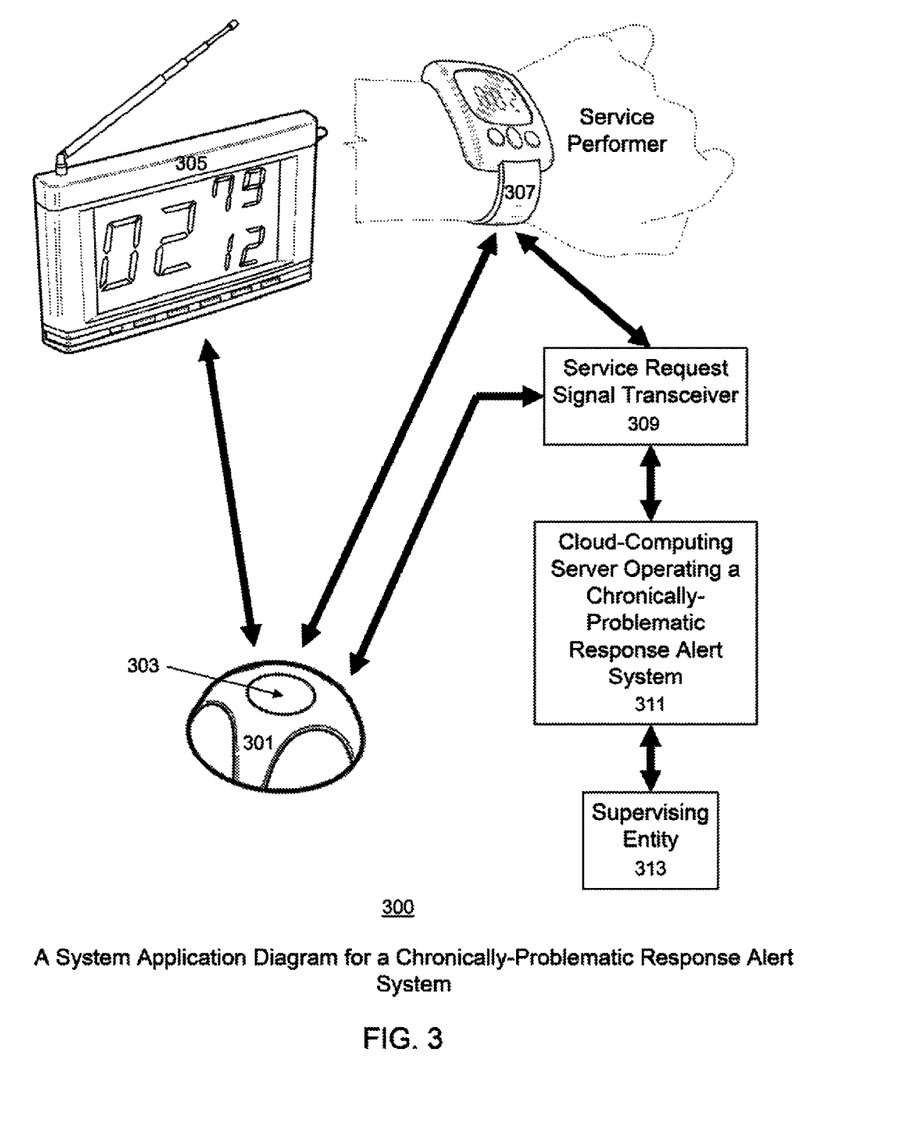
FIG. 3 shows a system application diagram for a chronically-problematic response alert system, in accordance with an embodiment of the invention.

FIG. 3 shows a system application diagram (300) for a chronically-problematic response alert system (311) implemented on a cloud-computing server, in accordance with an embodiment of the invention. In a preferred embodiment of the invention, one or more service request devices (301) are part of a chronically-problematic response alert system network. Preferably, each service request device (301) includes a bell button (303) that can be depressed by a service requester to trigger transmission of a service request signal to one or more service request reception devices (305, 307) that are within the wireless signal reception range for the chronically-problematic response alert system network.

In one embodiment of the invention, the wireless communication between each service request device (e.g. 301) and each service request reception device (305 or 307) utilizes a 433 MHz center frequency, with transmission and reception range of several hundred meters. In another embodiment of the invention, a different operating frequency is utilized for the wireless communication between each service request device (e.g. 301) and each service request reception device (305 or 307). Yet in another embodiment of the invention, the wireless communication between each service request device (e.g. 301) and each service request reception device (305 or 307) can utilize wireless local area network (LAN) protocols or cellular communication signals for device interoperability and cost efficiency with existing mobile electronic devices, signal repeaters, and routers.

Continuing with FIG. 3, in one embodiment, a service request device (301) with a bell button (303) can transmit a service request signal to a multiple number of service request reception devices (e.g. 305, 307). Preferably, the service request signal is transmitted directly from the service request device (301) to the multiple number of service request reception devices (e.g. 305, 307). In some embodiments of the invention, signal repeaters or wireless routers may be involved in transmission of service request signals. A service performer who is watching a scoreboard-style service request reception device (305), or another service performer who is wearing a watch-style service request reception device (307) can respond to the service request signal, and physically approach a location identified by the service request signal. In the example as shown in FIG. 3, "02" or "002" as displayed in the service request reception devices (e.g. 305, 307) may be a table number at a restaurant, or a particular number associated with a designated location in another business operation. Furthermore, the scoreboard-style service request reception device (305) may also display other service request signals (e.g. "79," "12") that are queued into the scoreboard-style service request reception device (305) after receiving the service request signal for "02" earlier.

In a preferred embodiment of the invention, the chronically-problematic response alert system (311) is implemented in a cloud-computing computer server that is operatively connected to both the Internet and a service request signal transceiver (309) for communicating with service request reception devices and service request devices that are not connected to the Internet. By embodying the chronically-problematic response alert system (311) in a cloud computing server, in case of the preferred embodiment of the invention as shown in FIG. 3, a convenient level of scalability, portability, and interoperability of the chronically-problematic response alert system (311) can be achieved without a cumbersome, labor intensive, and inconvenient on-site local system configuration for implementing the chronically-problematic response alert system (311). In another embodiment of the invention, the chronically-problematic response alert system may be implemented in a computer server that is not part of the cloud computing resources.

As shown in FIG. 3, the service request signal transceiver (309) may acquire, demodulate, and process wireless signals among a plurality of service request devices and service request reception devices for data analysis by the chronically-problematic response alert system (311). In some instances, for design simplicity and cost efficiency, a service request signal receiver-only unit may be utilized in the system application instead of the service request signal transceiver (309), which is capable of both receiving and transmitting signals for the chronically-problematic response alert system (311).

The demodulated and processed signals may be then transmitted to the chronically-problematic response alert system (311), which tracks, measures, and analyzes various parameters gathered from wireless signal transmissions among the plurality of service request devices and service request reception devices. For example, an analytical and alert threshold determination module executed on a CPU and a memory unit of the chronically-problematic response alert system (311) may receive, assemble, and analyze a first set of relational data that tracks time elapsed between a first service request bell press from a service request device and a confirmatory signal of successful service fulfillment from a service request reception device. The analytical and alert threshold determination module may also receive, assemble, and analyze a second set of relational data that tracks a number of repeated service request bell presses from the service request device and the confirmatory signal of successful service fulfillment from the service request reception device.

Continuing with FIG. 3, in a preferred embodiment of the invention, if the first set of relational data and the second set of relational data for a particular service performer are substantially worse than first sets of relational data and second sets of relational data for other performers for a defined period of time (e.g. per day, per week, per month, and etc.), then the analytical and alert threshold determination module may determine that the particular service performer has exhibited "chronically-problematic responses" to service requests, and inform a supervising entity (313) via an email alert, a text alert, or another computerized electronic communication method using a data and alert communication module, wherein the data and alert communication module is executed on the CPU and the memory unit of the chronically-problematic response alert system (311) implemented in a computer server. The supervising entity (313) may be an electronic device held by a supervisor, a quality control staff member, or another appropriate professional overseeing the general behaviors of service performers in a business operation.

Figure 4:
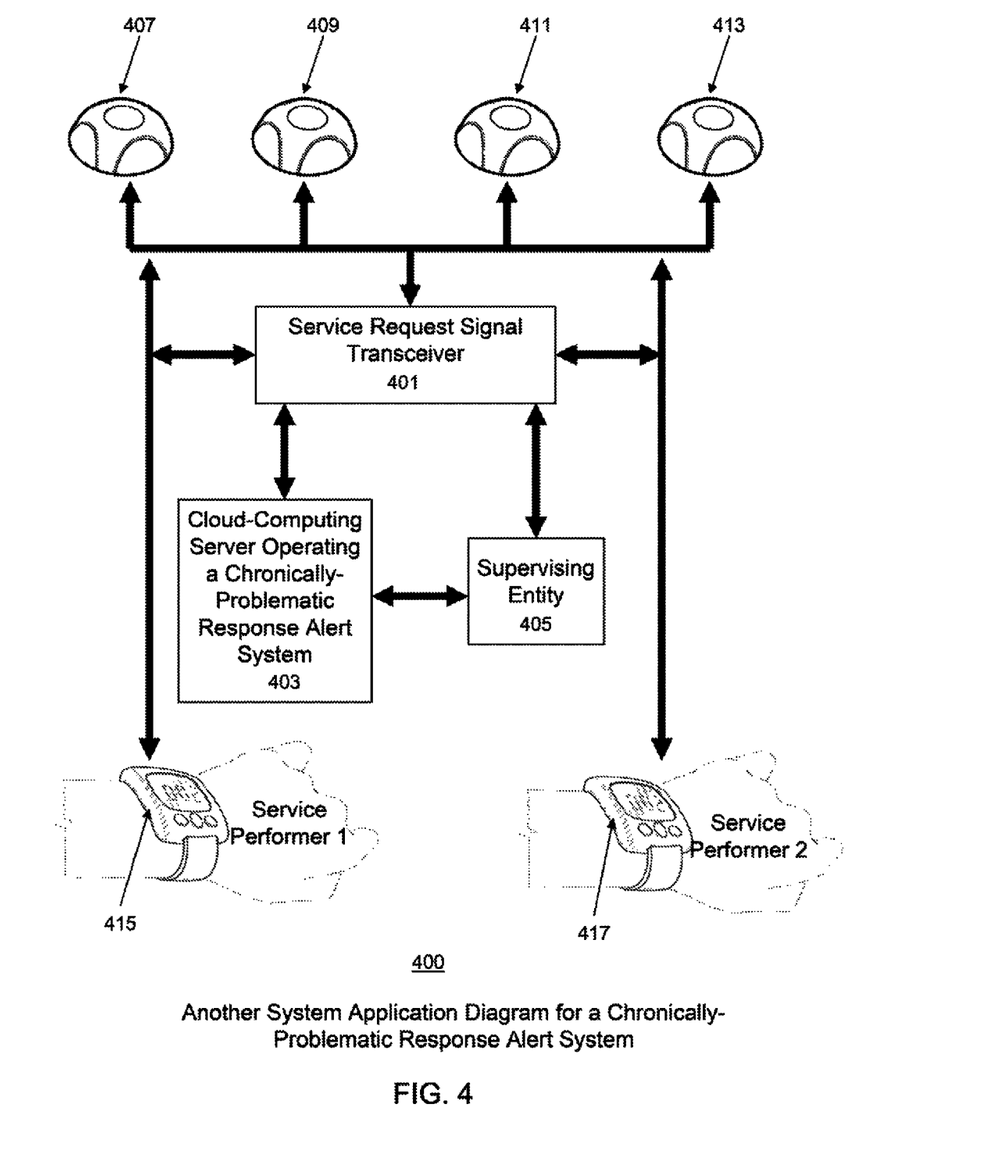
FIG. 4 shows another system application diagram for a chronically-problematic response alert system, in accordance with an embodiment of the invention.

FIG. 4 shows another system application diagram (400) for a chronically-problematic response alert system, in accordance with an embodiment of the invention. In this embodiment of the invention, a plurality of service request devices (407, 409, 411, 413) are part of a chronically-problematic response alert system network. Preferably, each service request device (407, 409, 411, or 413) includes a bell button that can be depressed by a service requester to trigger transmission of a service request signal to one or more service request reception devices (415, 417) that are within the wireless signal reception range for the chronically-problematic response alert system network.

In one embodiment of the invention, the wireless communication between each service request device (e.g. 407, 409, 411, or 413) and each service request reception device (415 or 417) utilizes a 433 MHz center frequency, with transmission and reception range of several hundred meters. In another embodiment of the invention, a different operating frequency is utilized for the wireless communication between each service request device (e.g. 407, 409, 411, or 413) and each service request reception device (415 or 417). Yet in another embodiment of the invention, the wireless communication between each service request device (e.g. 407, 409, 411, or 413)) and each service request reception device (415 or 417) can utilize wireless local area network (LAN) protocols or cellular communication signals for device interoperability and cost efficiency with existing mobile electronic devices, signal repeaters, and routers.

Continuing with FIG. 4, in one embodiment, a service request device (407, 409, 411, or 413) with a bell button can transmit a service request signal to a multiple number of service request reception devices (e.g. 415, 417). Preferably, the service request signal is transmitted directly from the service request device (409, 411, or 413) to the multiple number of service request reception devices (e.g. 415 or 417). In some embodiments of the invention, signal repeaters or wireless routers may be involved in transmission of service request signals. Both "Service Performer 1" and "Service Performer 2" who wear watch-style service request reception devices (415, 417) can attempt to respond to the service request signal. In one embodiment of the invention, if a multiple number of service performers is available to respond and fulfill a service request, a particular service performer who wishes to respond to the service request signal can seize that opportunity by depressing a functional button on his or her service request reception device (415 or 417) to inform other service performers that the service request is already in the process of being fulfilled. Then, the particular service performer can physically approach a location identified by the service request signal. In the example as shown in FIG. 4, "002" as displayed in the service request reception devices (e.g. 415, 417) may be a table number at a restaurant, or a particular number associated with a designated location in another business operation.

In a preferred embodiment of the invention, the chronically-problematic response alert system (403) is implemented in a cloud-computing computer server that is operatively connected to both the Internet and a service request signal transceiver (401) for communicating with service request reception devices and service request devices that are not connected to the Internet. By embodying the chronically-problematic response alert system (403) in a cloud computing server, in case of the preferred embodiment of the invention as shown in FIG. 4, a convenient level of scalability, portability, and interoperability of the chronically-problematic response alert system (403) can be achieved without a cumbersome, labor intensive, and inconvenient on-site local system configuration for implementing the chronically-problematic response alert system (403). In another embodiment of the invention, the chronically-problematic response alert system may be implemented in a computer server that is not part of the cloud computing resources.

As shown in FIG. 4, the service request signal transceiver (401) may acquire, demodulate, and process wireless signals among a plurality of service request devices and service request reception devices for data analysis by the chronically-problematic response alert system (403). In some instances, for design simplicity and cost efficiency, a service request signal receiver-only unit may be utilized in the system application instead of the service request signal transceiver (401), which is capable of both receiving and transmitting signals for the chronically-problematic response alert system (403).

The demodulated and processed signals may be then transmitted to the chronically-problematic response alert system (403), which tracks, measures, and analyzes various parameters gathered from wireless signal transmissions among the plurality of service request devices and service request reception devices.

For example, an analytical and alert threshold determination module executed on a CPU and a memory unit of the chronically-problematic response alert system (403) may receive, assemble, and analyze a first set of relational data that tracks time elapsed between a first service request bell press from a service request device and a confirmatory signal of successful service fulfillment from a service request reception device. The analytical and alert threshold determination module may also receive, assemble, and analyze a second set of relational data that tracks a number of repeated service request bell presses from the service request device and the confirmatory signal of successful service fulfillment from the service request reception device.

Continuing with FIG. 4, in a preferred embodiment of the invention, if the first set of relational data and the second set of relational data for a particular service performer are substantially worse than first sets of relational data and second sets of relational data for other performers for a defined period of time (e.g. per day, per week, per month, and etc.), then the analytical and alert threshold determination module may determine that the particular service performer has exhibited "chronically-problematic responses" to service requests, and inform a supervising entity (405) via an email alert, a text alert, or another computerized electronic communication method using a data and alert communication module, wherein the data and alert communication module is executed on the CPU and the memory unit of the chronically-problematic response alert system (403) implemented in a computer server. The supervising entity (403) may be an electronic device held by a supervisor, a quality control staff member, or another appropriate professional overseeing the general behaviors of service performers in a business operation.

Figure 5:
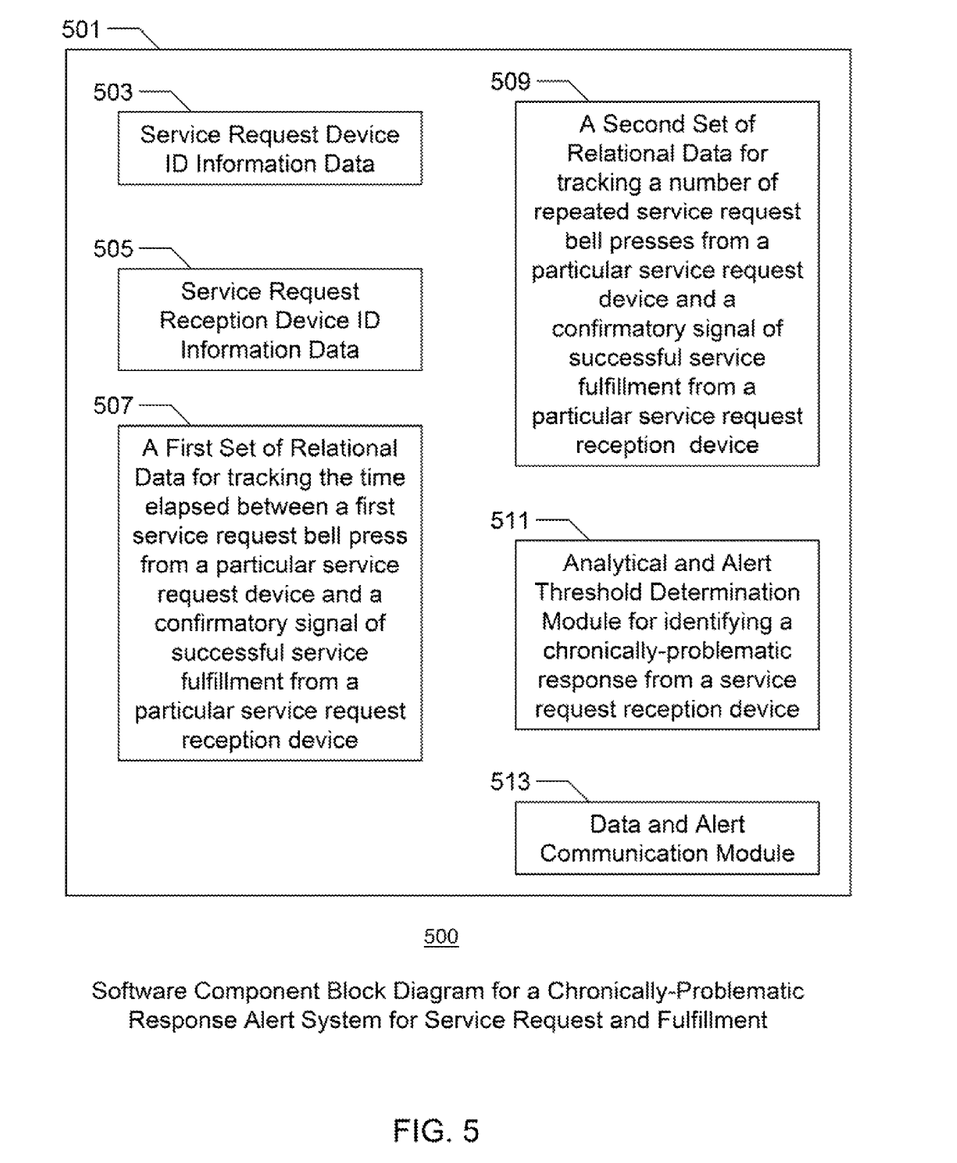
FIG. 5 shows a software component block diagram for a chronically-problematic response alert system for service request and fulfillment between a service requester and a service performer, in accordance with an embodiment of the invention.
Figure 6:
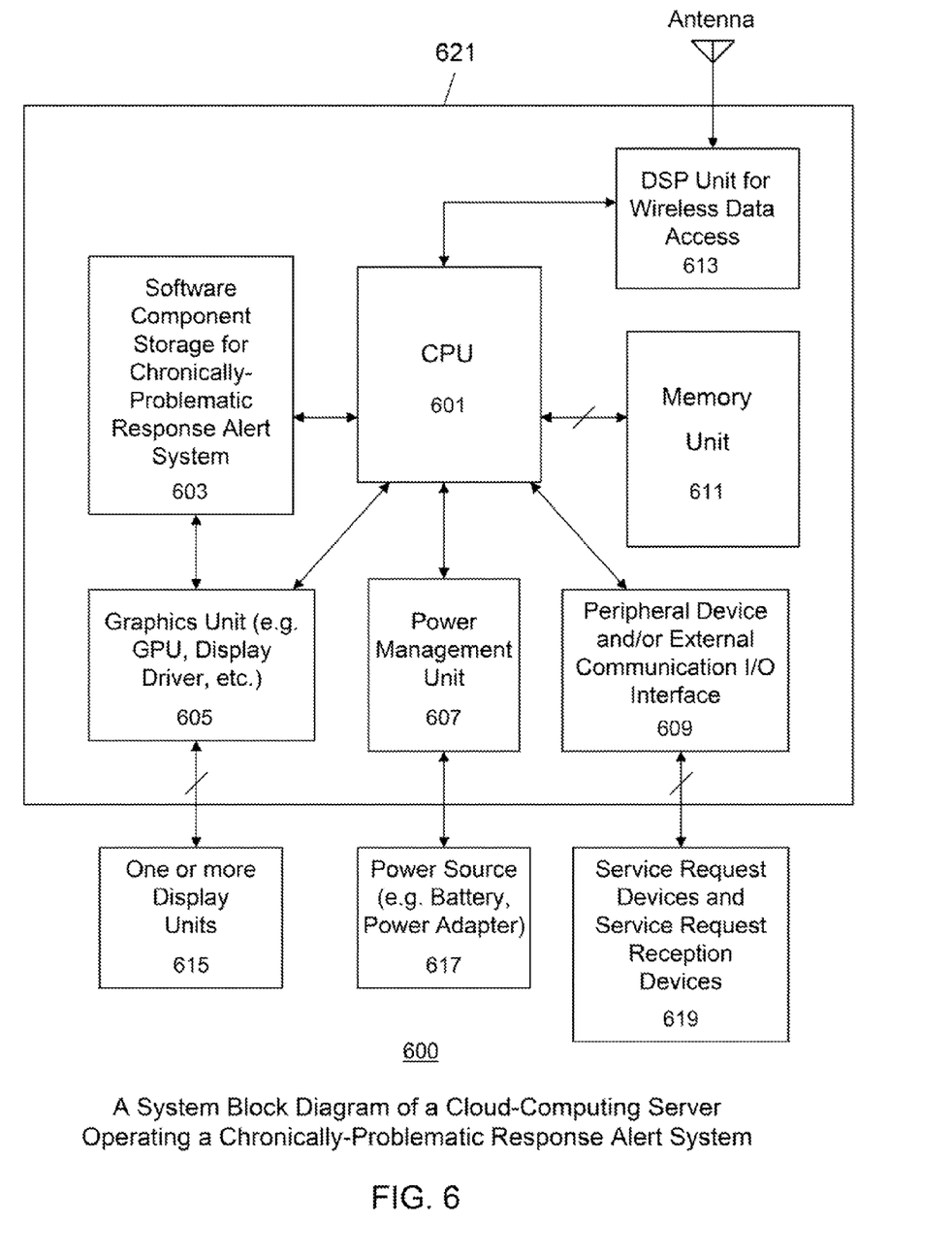
FIG. 6 shows a system block diagram of a cloud-computing server operating a chronically-problematic response alert system, in accordance with an embodiment of the invention.

FIG. 5 shows a software component block diagram (500) for a chronically-problematic response alert system for service request and fulfillment between a service requester and a service performer, in accordance with an embodiment of the invention. In a preferred embodiment of the invention, software components (501) of the chronically-problematic response alert system are configured to be stored in a data storage (e.g. 603 in FIG. 6) associated with a computer server, and are also configured to be uploaded to and executed in a memory unit and a CPU of the computer server, as also illustrated in FIG. 6.

Furthermore, in the preferred embodiment of the invention, the software components (501) of the chronically-problematic response alert system comprise an analytical and alert threshold determination module (511) and a data and alert communication module (513). The software components (501) further include service request device identification (ID) information data (503), service request reception device identification (ID) information data (505), and a first set of relational data (507) for tracking the time elapsed between a first service request bell press from a particular service request device and a confirmatory signal of successful service fulfillment from a particular service request reception device or the particular service request device. The software components (501) can also include a second set of relational data (509) for tracking a number of repeated service request bell presses from a particular service request device and a confirmatory signal of successful service fulfillment from a particular service request reception device. In some embodiments of the invention, the second set of relational data (509) also tracks time interval(s) between each of the repeated service request bell presses, because an increasing frequency of repeated bell presses can suggest a service requester's growing dissatisfaction with a service performer's response time.

For example, if a customer presses a service request bell from a particular service request device for the first time, waits three more minutes subsequently before a second bell press, waits an additional two minutes subsequently before a third bell press, and waits one more minute subsequently before a fourth bell press because a service performer still has not shown up at all, then the increasing frequency of repeated bell presses (i.e. a reduced time interval between bell presses) prior to an appropriate response from the service performer may suggest that the service performer is exhibiting a significant behavioral problem in responding to the service request bell. Therefore, if the reduced time interval between bell presses becomes persistent for the service performer due to his or her slow or unacceptable response time to numerous service requests, then this reduced time interval parameter tracked by the second set of relational data (509) may be utilized as a primary factor for determining whether the service performer exhibits chronically-problematic responses that are worthy of generating an alert to a supervising entity or not.

In some embodiments of the invention, the decreasing time interval between each of the repeated service request bell presses and the number of repeated service request bell presses, which are tracked by the second set of relational data (509), may be the primary factors for determining an alert threshold level for chronically-problematic response alerts. For example, an alert threshold level for a plurality of service performers may be set as three separate instances of at least four repeated bell presses per instance, with significant decreases in time intervals between the bell presses in each instance. Preferably, this data tracking may be reset per service performer over a certain period of time (e.g. daily, weekly, monthly, and etc.). In another embodiment of the invention, one or more combinations of data parameters in the first set of relational data (507) and the second set of relational data (509) can be utilized using various statistical methods for computing and determining an alert threshold level. Furthermore, in one embodiment of the invention, a "normal" or "target" response profile may be created for one or more service performers and their associated service request reception devices, so that any service performers who statistically deviate from the "normal" or "target" response profile for a persistent period of time in multiple instances are flagged as problematic for alert determination.

In the preferred embodiment of the invention, the analytical and alert threshold determination module (511) is executed on the CPU and the memory unit of a computer server. The analytical and alert threshold determination module (511) is capable of identifying and determining one or more "chronically-problematic responses" by analyzing the first set of relational data (507) and/or the second set of relational data (509) that characterize a service performer's behavior associated with the service performer's service request reception device. Furthermore, the data and alert communication module (513) is also executed on the CPU and the memory unit of the computer server that implements the chronically-problematic response alert system. In the preferred embodiment of the invention, the data and alert communication module (513) is capable of generating and transmitting an alert to a supervising entity, if the analytical and alert threshold determination module (511) successfully identifies and determines one or more chronically-problematic responses associated with the service performer's service request reception device to exceed an alert threshold level.

In one embodiment of the invention, the alert threshold level is manually adjustable by a supervising entity or another authorized user who utilizes a computerized user interface to set a particular alert threshold level. For example, an alert threshold level can be set by the supervising entity as "high sensitivity," "medium sensitivity," or "low sensitivity," which in turn adjusts what the analytical and alert threshold determination module (511) determines as a chronically-problematic response for a particular service performer's behavior. Setting the alert threshold level to "high sensitivity" can decrease the trigger tolerance of the alert threshold level for the measured time for the first set of relational data (507) and the measured number of repeated service request bell presses for the second set of relational data (509), so that even a small amount of deviation from a "normal" or average statistical profiles can trigger the alert to the supervising entity. Similarly, setting the alert threshold level to "low sensitivity" can increase the trigger tolerance of the alert threshold level for the measured time for the first set of relational data (507) and the measured number of repeated service request bell presses for the second set of relational data (509), so that small amounts of deviation from a "normal" or average statistical profiles do not trigger the alert to the supervising entity.

Furthermore, in one embodiment of the invention, the supervising entity can configure or set a desirable target response time as an alert threshold level for service performers, so that some service performers who are taking more time than the desirable target response time can be flagged or marked as "problematic" at least once. In this embodiment, if a particular service performer repeatedly exceeds the desirable target response time, the analytical and alert threshold determination module (511) may determine that the particular service performer is exhibiting a "chronically-problematic response" and alert the supervising entity accordingly.

Continuing with FIG. 5, in the preferred embodiment of the invention, the first set of relational data (507) and the second set of relational data (509) are gathered, categorized, and stored over a defined period of time (e.g. daily, weekly, monthly, and etc.) via wireless data communication with a plurality of service request devices and service request reception devices in a business operation. Relational data sets can be established and updated by associating a particular service request device ID from the service request device ID information data (503) with a particular service request reception device ID from the service request reception device ID information data (505) and an additional piece of analytically-useful information, such as the time elapsed from the first service request bell press, as described in association with the first set of relational data (507), and the number of repeated service request bell presses, as described in association with the second set of relational data (509).

In one embodiment of the invention, the analytical and alert threshold determination module (511) that identifies and determines the chronically-problematic responses compares the first set of relational data (507) and/or the second set of relational data (509) for a particular service performer against averaged values derived from other service performers. In another embodiment of the invention, the analytical and alert threshold determination module (511) utilizes another suitable statistical method to identify and determine the chronically-problematic responses from a particular service performer.

FIG. 6 shows a system block diagram (600) of a cloud-computing server (621) operating a chronically-problematic response alert system, in accordance with an embodiment of the invention. In a preferred embodiment of the invention, the chronically-problematic response alert system implemented in the cloud-computing server (621) is capable of identifying, determining, and reporting chronically-problematic responses for service request and fulfillments between a service requester and a service performer.

In the preferred embodiment of the invention, the chronically-problematic response alert system comprises a CPU (601) and a memory unit (611), which are configured to execute and process a plurality of computerized instructions and data. Furthermore, the chronically-problematic response alert system includes a first set of relational data that tracks time elapsed between a first service request bell press from a service request device and a confirmatory signal of successful service fulfillment from a service request reception device. The chronically-problematic response alert system also includes a second set of relational data that tracks a number of repeated service request bell presses from the service request device and the confirmatory signal of successful service fulfillment from the service request reception device.

Preferably, the first set and the second set of relational data are gathered and stored in a data storage unit (603), which is operatively connected to the CPU (601) and the memory unit (611) to upload any portion of the first set of relational data and the second set of relational data based on data uploading instructions from an analytical and alert threshold determination module (e.g. 511 of FIG. 5). In the preferred embodiment of the invention, the analytical and alert threshold determination module itself is uploaded from the data storage unit (603) to the memory unit (611), and then executed in the CPU (601). The analytical and alert threshold determination module is capable of identifying and determining chronically-problematic responses by analyzing the first set and/or the second set of relational data that characterize a particular service performer's behavior associated with the service performer's service request reception device.

Continuing with FIG. 6, in the preferred embodiment of the invention, the chronically-problematic response alert system also includes a graphics unit (605) (e.g. a graphics processor, a display driver, and etc.), a power management unit (607), a peripheral device and/or external communication I/O interface (609), and a digital signal processing (DSP) unit for wireless data access (613). These logical units may be placed on a single printed circuit board in one embodiment of the invention, or on a plurality of printed circuit boards in another embodiment of the invention.

Furthermore, in the preferred embodiment of the invention, the CPU (601) is configured to control each logical unit operatively (i.e. directly or indirectly) connected to the CPU (601). The memory unit (611) typically comprises volatile memory banks based on DRAM's. In some embodiments of the invention, the memory unit (611) may use non-volatile memory technologies such as SRAM's and/or Flash memory. The memory unit (611) is capable of storing or uploading programs and applications which can be executed by the CPU (601), the graphics unit (605), or another logical unit operatively connected to the memory unit (611). In particular, in the preferred embodiment of the invention, software components such as the analytical and alert threshold determination module (e.g. 511 of FIG. 5), the data and alert communication module (e.g. 513 of FIG. 5), and/or other software components, which are stored in the data storage unit (603), are executed on the CPU (601) and the memory unit (611) of the chronically-problematic response alert system as needed.

In addition, as shown in FIG. 6, the digital signal processing (DSP) unit (613) for wireless data access is operatively connected to an radio frequency (RF) antenna. The digital signal processing (DSP) unit (613) for wireless data access is generally configured to receive and transmit data packets for information associated with service request devices and service request reception devices. The DSP unit (613) can also communicate with other devices or other cloud-computing resources in a local area network and the Internet. Moreover, the power management unit (607) is operatively connected to a power supply unit and a power source (e.g. battery, power adapter) (617), and the power management unit (607) generally controls power supplied to various logical units in the cloud computing server (621). Furthermore, the peripheral device and/or external communication I/O interface (609), as shown in FIG. 6, can be operatively connected to a plurality of service request devices, service request reception devices, peripheral devices to the cloud computing server (621), and other electronic devices.

Continuing with FIG. 6, in the preferred embodiment of the invention, the graphics unit (605) in the system block diagram (600) for the cloud computing server (621) comprises a graphics processor, a display driver, a dedicated graphics memory unit, and/or another graphics-related logical components. In general, the graphics unit (605) is able to process and communicate graphics-related data with the CPU (601), the display driver, and/or the dedicated graphics memory unit. The graphics unit (605) is also operatively connected to one or more display units (615).

Figure 7:
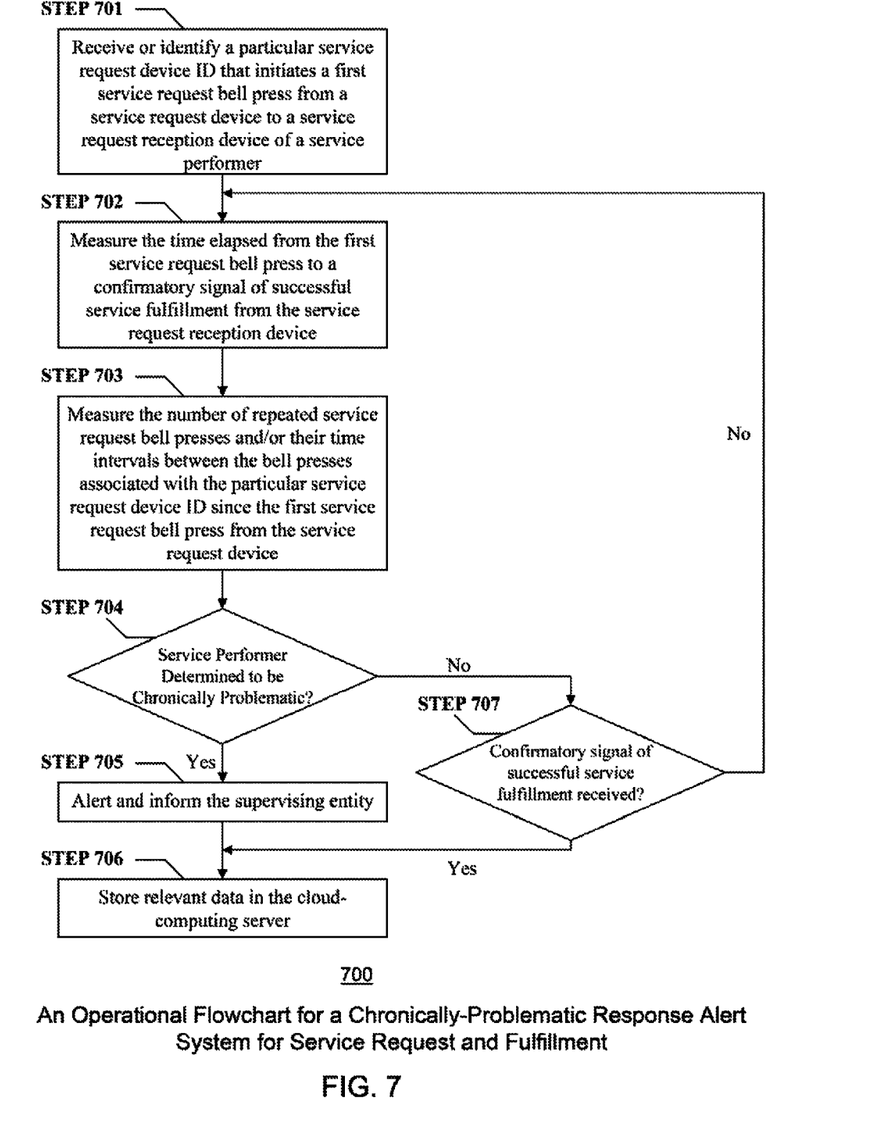
FIG. 7 shows an operational flowchart for a chronically-problematic response alert system for service request and fulfillment, in accordance with an embodiment of the invention.

FIG. 7 shows an operational flowchart (700) for a chronically-problematic response alert system for service request and fulfillment, in accordance with an embodiment of the invention. In the embodiment of the invention as shown in the operational flowchart (700) of FIG. 7, the chronically-problematic response alert system first receives or identifies a particular service request device ID that initiates a first service request bell press from a service request device to a service request reception device belonging to a service performer in a business operation, as shown in STEP 701. Preferably, the information received or identified by the chronically-problematic response alert system can be wirelessly transmitted from one or more service request devices to a DSP unit (e.g. 613 of FIG. 6), an external communication I/O interface (e.g. 609 of FIG. 6), and/or a service request signal transceiver (e.g. 309 of FIG. 3). Then, in one embodiment of the invention, an analytical and alert threshold module and a data and alert communication module are executed on a CPU and a memory unit of the chronically-problematic response alert system.

Subsequently, as shown in STEP 702, the analytical and alert threshold module for the chronically-problematic response alert system measures the time elapsed from the first service request bell press to a confirmatory signal of successful fulfillment from the service request reception device, and updates a first set of relational data (e.g. 507 of FIG. 5). In addition, the analytical and alert threshold module for the chronically-problematic response alert system also measures the number of repeated service request bell presses associated with the particular service request device ID since the first service request bell press from the service request device, and then updates a second set of relational data (e.g. 509 of FIG. 5), as shown in STEP 703. Optionally, the time intervals between each service request bell press can also be measured and tracked by the analytical and alert threshold module for the chronically-problematic response alert system and the second set of relational data (e.g. 509 of FIG. 5), as explained previously.

Continuing with FIG. 7, as shown in STEP 704, if a particular service performer is determined to be chronically problematic in responding or fulfilling service requests by the analytical and alert threshold module, then the chronically-problematic response alert system transmits an alert to a supervising entity via email, telephone, or another method of electronic communication, as shown in STEP 705. In one embodiment of the invention, the alert may contain a name of the particular service performer, a device ID of the service request reception device held by the particular service performer, and a brief description of the chronic problems associated with the particular service performer. Then, any relevant data utilized in the data analysis and the alert generation may be stored in a data storage of a computer server that implements the chronically-problematic response alert system, as shown in STEP 706.

On the other hand, if the particular service performer is determined to be not or not yet chronically-problematic in responding or fulfilling service requests by the analytical and alert threshold module, then the chronically-problematic response alert system checks whether the confirmatory signal of successful service fulfillment is received by the DSP unit (e.g. 613 of FIG. 6), the external communication I/O interface (e.g. 609 of FIG. 6), the service request signal transceiver (e.g. 309 of FIG. 3), and/or the data and alert communication module (e.g. 514 of FIG. 5), as shown in STEP 707. Then, if the confirmatory signal of successful service fulfillment is received, the chronically-problematic response alert system stores relevant data in the data storage of the computer server that implements the chronically-problematic response alert system, as shown in STEP 706. In contrast, if the confirmatory signal of successful service fulfillment is not yet received, then the chronically-problematic response alert system loops back to the beginning of STEP 702, as shown in FIG. 7.

Figure 8:
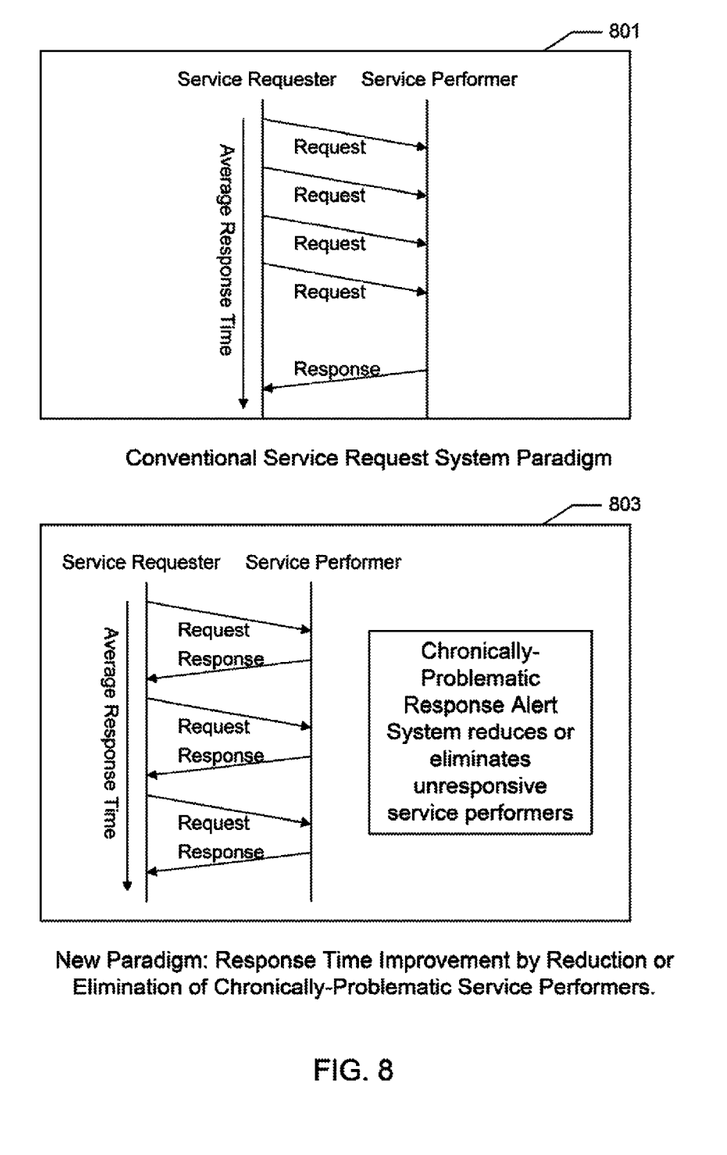
FIG. 8 shows a conventional service request paradigm and a novel paradigm of the present invention enabled by the chronically-problematic response alert system, in accordance with an embodiment of the invention.

FIG. 8 shows a conventional service request paradigm (801) and a novel paradigm (803) of the present invention enabled by the chronically-problematic response alert system, in accordance with an embodiment of the invention. In the conventional service request paradigm (801), a service requester utilizing a service request device to summon a service performer may typically experience significant response delays from the service performer, because there is no incentive or discipline associated with a rapid response to the service request device. Therefore, a multiple number of bell presses may be required before the service performer shows up. Even worse, if the service performer is unmotivated or unprofessional, the bell presses may be completely neglected or ignored by the service performer. Furthermore, in the conventional service request paradigm (801), it is difficult for a supervising entity to identify or catch slow, unmotivated, and/or unprofessional service performers, let alone gather evidence of potentially significant and chronic problems associated with certain service performers.

In contrast, in the novel paradigm (803) of the present invention, a service performer's behavior with his or her service request reception device is automatically monitored and analyzed in real-time by a chronically-problematic response alert system that intercepts wireless communications between a service request device and a service request reception device. In various embodiments of the invention, the chronically-problematic response alert system is capable of identifying and determining chronically-problematic responses by one or more service performers. By re-training, removing, or motivating these chronically-problematic service performers to reduce average response time between themselves and service requesters, business operations can uniquely improve customer satisfaction and operational efficiency in many situations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electronic alert system for identifying, determining, and reporting chronically-problematic responses for service request and fulfillments between a service requester and a service performer, the electronic alert system comprising:
   a CPU and a memory unit configured to execute and process a plurality of computerized instructions and data;
   a first set of relational data that tracks time elapsed between a first service request bell press from a service request device and a confirmatory signal of successful service fulfillment from a service request reception device, wherein the confirmatory signal of successful service fulfillment is generated by the service request reception device that incorporates a proximity sensor to detect a nearing distance between the service request reception device and the service request device;
   a second set of relational data that tracks a number of repeated service request bell presses, a time interval between each of the repeated service request bell presses from the service request device, and the confirmatory signal of successful service fulfillment from the service request reception device, wherein a reduction in the time interval between each of the repeated service request bell presses from the service request device is determined as a chronically-problematic response by an analytical and alert threshold determination module;
   the analytical and alert threshold determination module executed on the CPU and the memory unit, wherein the analytical and alert threshold determination module identifies and determines the chronically-problematic responses by analyzing the first set of relational data and the second set of relational data that characterize the service performer's behavior associated with the service performer's service request reception device;
   a data storage that stores the first set of relational data and the second set of relational data, wherein the data storage is operatively connected to the CPU and the memory unit to upload any portion of the first set of relational data and the second set of relational data based on data uploading instructions from the analytical and alert threshold determination module; and
   a data and alert communication module executed on the CPU and the memory unit, wherein the data and alert communication module generates and transmits an alert to a supervising entity, if the analytical and alert threshold determination module identifies and determines the chronically-problematic responses associated with the service performer's service request reception device to exceed an alert threshold level.

2. The electronic alert system of claim 1, further comprising a service request signal receiver or a service request signal transceiver capable of acquiring, demodulating, and processing wireless data signals from the service request device and the service request reception device.

3. The electronic alert system of claim 2, wherein the confirmatory signal of successful service fulfillment from the service request reception device is received by at least one of a peripheral device and external communication I/O interface, the service request signal receiver, the service request signal transceiver, and a digital signal processing (DSP) unit operatively connected to the CPU and the memory unit.

4. The electronic alert system of claim 1, further comprising a peripheral device and external communication I/O interface that operatively connects the electronic alert system with the service request device, the service request reception device, a modem, an Internet router, or another electronic device for wired or wireless communications.

5. The electronic alert system of claim 4, wherein the data and alert communication module generates and transmits the alert in form of a data packet to the supervising entity by utilizing the peripheral device and external communication I/O interface.

6. The electronic alert system of claim 4, wherein the data and alert communication module executed on the CPU and the memory unit, and the peripheral device and external communication I/O interface are configured to operate as part of a cloud-computing server that embodies the electronic alert system.

7. The electronic alert system of claim 1, wherein the analytical and alert threshold determination module that identifies and determines the chronically-problematic responses compares the first set of relational data and the second set of relational data for the service performer against averaged values derived from other service performers.

8. The electronic alert system of claim 1, further comprising a digital signal processing (DSP) unit for wireless data access.

9. The electronic alert system of claim 1, further comprising a power management unit and an electrical power source.

10. The electronic alert system of claim 1, further comprising a graphics unit and one or more display units.

11. The electronic alert system of claim 1, wherein the service request device is utilized by a customer, a client, a colleague, or another service requester who is requesting a service to the service performer.

12. A method of operating a chronically-problematic response alert system, the method comprising the steps of:
   receiving or identifying a particular service request device ID that initiates a first service request bell press from a service request device to a service request reception device of a service performer, wherein the particular service request device ID is received or identified via an analytical and alert threshold module and a data and alert communication module executed on a CPU and a memory unit of the chronically-problematic response alert system;
   measuring time elapsed from the first service request bell press to a confirmatory signal of successful service fulfillment from the service request reception device by utilizing the analytical and alert threshold module executed on the CPU and the memory unit of the chronically-problematic response alert system, wherein the confirmatory signal of successful service fulfillment is generated by the service request reception device that incorporates a proximity sensor to detect a nearing distance between the service request reception device and the service request device;
   measuring a number of repeated service request bell presses and a time interval between each of the repeated service request bell presses associated with the particular service request device ID since the first service request bell press from the service request device, wherein a reduction in the time interval between each of the repeated service request bell presses from the service request device is determined as a chronically-problematic response by an analytical and alert threshold determination module, and wherein the step of measuring the number of repeated service request bell presses and measuring the time interval between each of the repeated service request bell presses is performed by the analytical and alert threshold module executed on the CPU and the memory unit of the chronically-problematic response alert system;

if the service performer is determined to be chronically problematic by the analytical and alert threshold module, alerting and informing a supervising entity with identifying information of the service performer and a brief description of persistent problems associated with the supervising entity; and else if the service performer is determined not to be chronically problematic, checking whether the confirmatory signal of successful service fulfillment is received by the data and alert communication module executed on the CPU and the memory unit of the chronically-problematic response alert system.

13. The method of claim 12, further comprising a step of storing relevant data measured and tracked by the analytical and alert threshold module in a data storage unit of the chronically-problematic response alert system.

14. The method of claim 12, wherein the confirmatory signal of successful service fulfillment from the service request reception device is received by at least one of a peripheral device and external communication I/O interface, a service request signal receiver, a service request signal transceiver, and a digital signal processing (DSP) unit operatively connected to the CPU and the memory unit.

15. The method of claim 12, wherein the data and alert communication module generates and transmits an alert in form of a data packet to the supervising entity by utilizing a peripheral device and external communication I/O interface, which is part of the chronically-problematic response alert system.

16. The method of claim 12, wherein the analytical and alert threshold determination module that identifies and determines the chronically-problematic responses compares the first set of relational data and the second set of relational data for the service performer against averaged values derived from other service performers.

17. The method of claim 12, wherein the service request device is utilized by a customer, a client, a colleague, or another service requester who is requesting a service to the service performer.

18. The method of claim 12, wherein the chronically-problematic response alert system is part of a cloud-computing server operatively connected to the Internet, the service request device, and the service request reception device for data communication.

* * * * *